United States Patent
Shah et al.

(10) Patent No.: US 6,456,589 B1
(45) Date of Patent: Sep. 24, 2002

(54) METHOD OF COORDINATING THE RESPECTIVE OPERATIONS OF DIFFERENT RESTORATION PROCESSES

(75) Inventors: Jasvantrai C. Shah, Richardson; Lee D. Bengston, Murphy; Mark W. Sees, Allen; Sridhar Alagar, Dallas; Bryan McGlade, Plano; Hal Badt, Richardson, all of TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/149,590

(22) Filed: Sep. 8, 1998

(51) Int. Cl.[7] .............................................. G01R 31/08

(52) U.S. Cl. ....................................... 370/228; 370/248

(58) Field of Search ................................ 370/218, 221, 370/225, 228, 229, 242, 248, 216; 379/221

(56) References Cited

U.S. PATENT DOCUMENTS

| | | | |
|---|---|---|---|
| 4,825,206 A | | 4/1989 | Brice, Jr. et al. |
| 5,548,639 A | * | 8/1996 | Ogura et al. ................. 379/221 |
| 5,590,118 A | * | 12/1996 | Nederlof ..................... 370/218 |
| 5,623,481 A | * | 4/1997 | Russ et al. ................... 370/225 |
| 5,850,505 A | * | 12/1998 | Grover et al. .......... 395/182.02 |
| 5,875,172 A | | 2/1999 | Tabata |
| 6,021,113 A | | 2/2000 | Doshi et al. |
| 6,044,064 A | * | 3/2000 | Brimmage et al. .......... 370/248 |

* cited by examiner

Primary Examiner—Chav Nguyen
Assistant Examiner—Alexander Boakye

(57) ABSTRACT

In a telecommunications network provisioned with different types of restoration processes, to ensure that the operation of one restoration process does not infringe upon other nodes that are actively executing a different restoration process, a request is sent by one of the restoration processes, under the guise of the operation system that oversees that process, to the operation system that oversees the other restoration process. The controller of the nodes that are performing the other restoration process, in receipt of the request, sends a disable restoration process message to those nodes under its control. Each of those nodes, upon receipt of the disable restoration process message, would disable the restoration process it is provisioned with so long as it is not actively engaging in that restoration process. If it is, it will continue to execute that restoration process until a safe stop point is reached, at which time it ceases that restoration process. Upon cessation of the particular restoration process, the node sends an acknowledge message to its controller, which, when in receipt of such acknowledge message from all of the nodes under its control, sends a disable acknowledged message to the controller of the first restoration process informing the latter that the nodes under its control can now be operated using the first restoration process. The above method is applicable to a telecommunications network provisioned with multiple layers of restoration processes including for example DRA, RTR and centralized restoration.

7 Claims, 2 Drawing Sheets

METHOD OF COORDINATING THE RESPECTIVE OPERATIONS OF DIFFERENT RESTORATION PROCESSES

CROSS REFERENCE TO RELATED APPLICATIONS

The instant invention relates to the following applications having Ser. No. 08/825,440 filed Mar. 28, 1997, Ser. No. 08/825,441 filed Mar. 28, 1997, Ser. No. 09/046,089 filed Mar. 23, 1998, Ser. No. 09/148/944 entitled "Restricted Reuse of Intact Portions of Failed Paths", and Ser. No. 09/149,591 entitled "Signal Conversion for Fault Isolation". The respective disclosures of those applications are incorporated by reference to the disclosure of the instant application.

The instant invention further relates to application Ser. No. 08/483,579 filed Jun. 7, 1995, now U.S. Pat. No. 5,812,524 Ser. No. 08/736,800 filed Oct. 25, 1996 and Ser. No. 08/781,495 filed Jan. 13, 1997 now U.S. Pat.No. 5,841,759. The respective disclosures of those applications are likewise incorporated by reference to the instant application.

FIELD OF THE INVENTION

This invention relates to restoration of disrupted traffic in a telecommunications network and more particularly the use and coordination of a plurality of restoration processes in the telecommunications network.

BACKGROUND OF THE INVENTION

To ensure that traffic disrupted by a failure in any span or link of a telecommunications network, such as for example by a cut of the link or a span, a restoration process whereby an alternate path is found for rerouting the disrupted traffic is needed. In fact, a combination of various restoration processes may be used under different circumstances for different purposes. There are at least three such different restoration processes that could operate after a disruption has occurred in the network for finding an alternate path to circumvent the disruption.

The first process is a simple one to one automatic line protect switching (ALPS) scheme in which a dedicated link is provided between adjacent nodes for reestablishing the path between the adjacent nodes were the link that ordinarily carry traffic between the adjacent nodes malfunctioned. Thus, when the working link connecting the adjacent nodes is cut, the disrupted traffic is quickly routed to the dedicated back-up link between the adjacent nodes.

A second approach for restoring traffic in a telecommunications network is a distributed restoration algorithm (DRA) scheme in which the spare links among the neighboring spans of adjacent nodes are used for finding an alternate route for rerouting the traffic disrupted between the adjacent nodes. This restoration process is more adaptative and sophisticated than the ALPS scheme. However, it also requires more intelligence and a somewhat longer operational time.

A third process involves the use of a central network operation center, which takes control following a failure anywhere within the network, so as to coordinate either a preplanned scheme or an ad hoc switching scheme for restoring the disrupted traffic. The time frame for such centralized operation ranges from seconds to hours, particularly if human intervention is needed.

Although the use of a combination of the three just mentioned restoration processes, and other restoration processes not mentioned herein, is desirable in a telecommunications network, a problem does arise in that the switching actions performed by one process may undermind the desired operation of another. In other words, the different restoration processes cannot operate simultaneously or smoothly with one another.

A need therefore exists for assuring that the various restoration processes be properly coordinated if those processes were to work in conjunction with each other in a telecommunications network.

BRIEF DESCRIPTION OF THE PRESENT INVENTION

To accomplish the proper coordination among the different layers of restoration processes in a telecommunications network provisioned with such restoration processes, the present invention method first determines the portions of the telecommunications network that are provisioned with the different restoration processes. This is needed insofar as only a certain portion of a network may in actuality be provisioned for distributed restoration. Once that is determined, if a disruption does occur, assuming that the DRA restoration process would first take place at the DRA provisioned portion of the network, the instant invention would request the operation support system (OSS) that oversees the DRA provisioned nodes, or digital cross-connect switches (DXCs) or intelligent devices, to order the DRA provisioned nodes to cease any DRA operations after the DRA process has been terminated. This is done by the DRA OSS broadcasting a disabled DRA message to those nodes that are DRA provisioned. In receipt of such a disabled DRA message, each of the DRA provisioned nodes then determines whether or not it is actively effecting a DRA operation in response to a failure. If it is not, the node would enter into a DRA disabled mode and respond to the DRA OSS with a disable acknowledge message. On the other hand, if the node is indeed actively engaged in a DRA restoration process, a DRA in progress message is returned to the DRA OSS. Thereafter, such node continues its DRA process until it reaches a safe stopping point. At which time the node enters into the DRA disabled mode and issues a disable acknowledge message to the DRA OSS.

When the DRA OSS has received from each of the relevant DRA provisioned nodes a disable acknowledge message, it forwards to the non-DRA OSS an indication that the non-DRA process can begin.

When the non-DRA restoration process is finished, the DRA OSS is requested to re-enable those DRA provisioned nodes to reactivate their DRA processing. An enable DRA message is then broadcast to all of the relevant DRA provisioned nodes.

The present invention technique therefore involves the controller of a first given restoration process requesting the controller of a second restoration process to cease operation and to give the first given restoration process control only when all of the nodes effecting the second restoration process have provided an acknowledgment that cessation has taken place. This request and acknowledge process is repeated for the various layers of restoration processes, so that coordination of the different restoration processes can be effected.

An objective of the present invention is therefore to provide a method for coordinating the respective operations of different restoration processes of a telecommunications network.

It is another objective of the present invention to provide a telecommunications network provisioned with a DRA scheme and other non-DRA schemes a method of mediating the operation of those various schemes.

BRIEF DESCRIPTION OF THE DRAWINGS

The above-mentioned objectives and advantages of the present invention will become apparent and the invention itself will be best understood by reference to the following description of an embodiment of the invention taken in conjunction with the accompanying drawings, wherein.

DETAILED DESCRIPTION OF THE INVENTION

Figure 1:
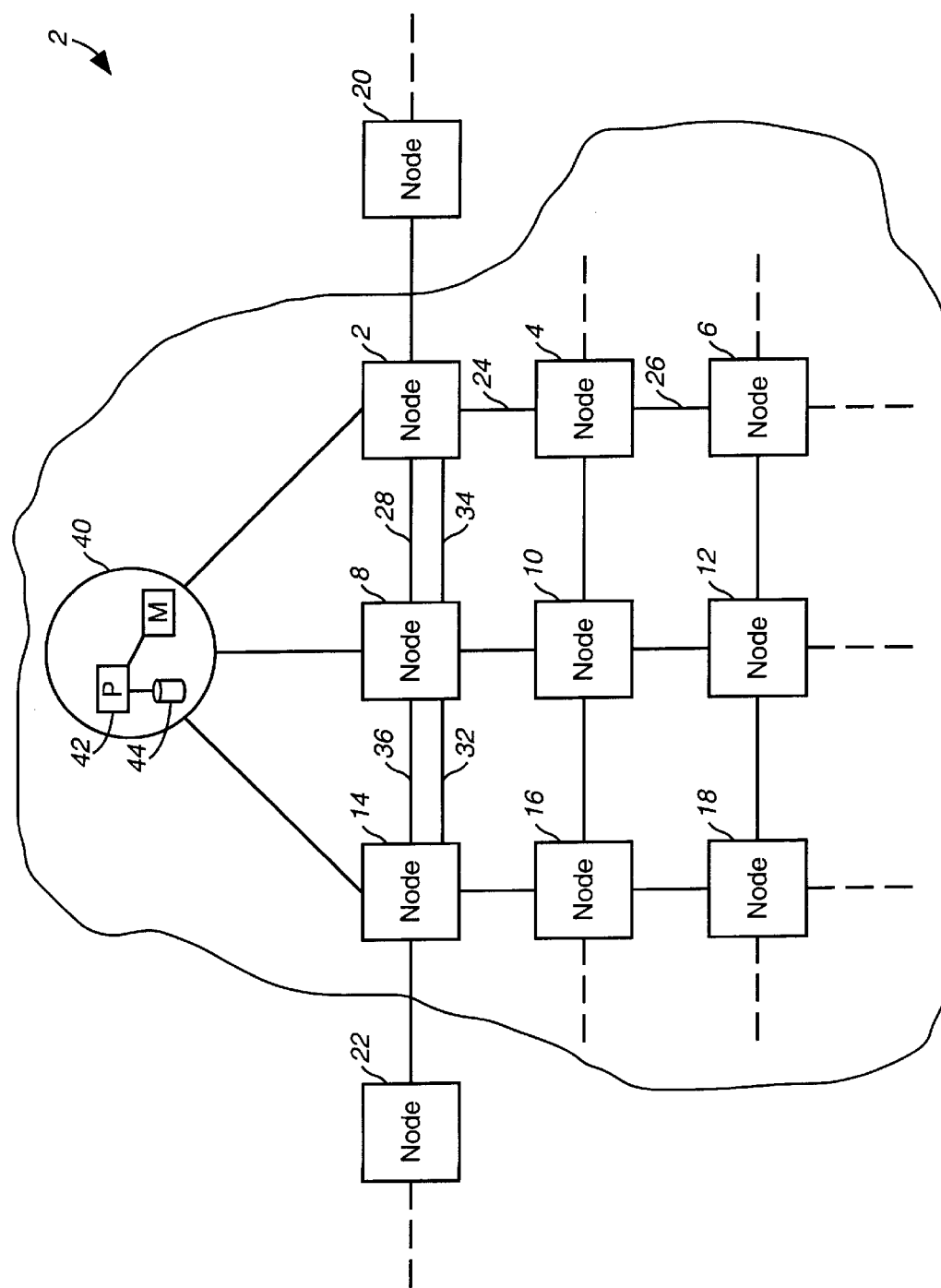
FIG. 1 is an illustration of a simplified telecommunications network including a portion that is provisioned with a DRA process.

As shown in FIG. 1, telecommunications network 2 has a number of nodes, or digital cross-connect switches or intelligent devices, 2–22 each connected to adjacent nodes by respective spans or links such as for example span 24 between nodes 2 and 4, span 26 between nodes 4 and 6, and span 28 between nodes 2 and 8, etc. For the instant invention, network 2 may be considered to be divided into an environment that is capable of distributed restoration, as nodes 2–18 within the dynamic transmission network restoration (DTNR) domain 30 are each provisioned with a distributed restoration algorithm (DRA). As is well known, each of the nodes 2–22 shown in FIG. 1 is for example a digital cross-connect switch such as for example that made by the Alcatel Network System Company with model number 1633-SX. Each of those switches in turn is connected to multiplexers or local telephone switches. For the sake of simplicity, in FIG. 1, such multiplexers and switches are not shown.

Further with respect to the nodes, note that each of the nodes for the FIG. 1 embodiment, in addition to the working span or link such as 24, 26 and 28, also has a spare link or span such as 32 between nodes 8 and 14, and a span or link 34 between nodes 2 and 8. For the sake of simplicity, the other spare links connecting the adjacent nodes in DTNR domain 30 are not shown. As is conventional with the typical digital cross-connect switches, protection channels such as 32 and 34 that cross-connect adjacent nodes are dedicated links or lines that, under ordinary circumstances where the network is operating normally, would sit idle. It is only when a malfunction or failure, such as for example a cut, has occurred on the working link that cross-connects two adjacent nodes such as for example node 8 and 14, that these dedicated spare links would act as conduits between those adjacent nodes for carrying the traffic now disrupted by the malfunctioning of the working link. One such example protection channel link 36 cross-connects adjacent nodes 8 and 14.

Dedicated lines such as 32 and 34 may be used for example different types of restoration processes which may include protection switching, DRA and real time restoration process (RTR). A more detailed description of that requires only hundreds of a second to come on line, as compared to the interaction between the adjacent nodes, including the description of the line terminating equipment (LTE) such as SONET LTEs interconnecting the various nodes, is provided in U.S. Pat. No. 5,657,320, assigned to the same assignee as the instant invention and which disclosure is incorporated by reference herein.

Returning to FIG. 1, note that within DTNR domain 30 is an operational support system (OSS) 40 by which the management of the network monitors, and conceivably controls, the overall operation of the network. For the understanding of the instant invention, suffice it to say that OSS 40 includes a cental processor 42, and the requisite memory store such as for example RAM and ROM connected thereto, for storing the requisite overall view, or map, of the layout of each of the nodes within the network. Such maps may be stored in a database store 44. Interface units which enable OSS 40 to communicate with the various nodes are not shown for the sake of simplicity. But for the connections between OSS 40 and nodes 2, 8 and 14, all other connections between OSS 40 and the remaining nodes of the DTNR domain 30 in FIG. 1 are not shown, again for the sake of simplicity. In sum, OSS 40 monitors the respective operations of each of the nodes within DTNR domain 30.

Even though OSS 40 is disclosed to be monitoring only those nodes provisioned with DRA, it should be appreciated that OSS may in fact also be monitoring the operation and goings on of nodes outside the DTNR domain 30, such as for example nodes 20 and 22. Alternatively, a non-DRA OSS, not shown, may also be provided in the FIG. 1 embodiment for monitoring the operations of those nodes outside of the DTNR domain 30.

Be that as it may, returning to the nodes within DTNR domain 30, note that each of those nodes is a broadband cross-connect switch that has a number of access/egress ports with their own IDs, and a number of working spare links, which may be in the form of fiber optic cables such as for example OC-12, or other communication nodes, links for carrying messages, in addition to the traffic, traversing among the interconnected nodes.

Given that the nodes of the network shown in FIG. 1 are provisioned with different restoration processes, such as for example the DRA and RTR processes, to ensure that the different restoration processes will not interfere with each other in the event that a malfunction occurs somewhere within the network, for the embodiment shown in FIG. 1, the following coordination or mediation method is utilized.

In particular, assume OSS 40 is a DRA OSS that monitors and controls the respective operations of nodes 2–18 in DTNR domain 30. If there is a non-DRA process, for example either a RTR process or a centralized restoration process that does not require DRA, a request has to be made from the controller of the non-DRA process to DRA OSS 40 to direct that any active DRA operations being performed by any of the nodes under its control be terminated. Assume that the controller of the non-DRA process is another OSS that is similar to OSS 40, or that OSS 40 monitors and controls both DRA provisioned nodes and non-DRA provisioned node of the network.

In any event, upon receipt of the request from the non-DRA process, DRA OSS 40 formulates a "disable DRA" message and broadcasts such to the appropriate nodes under its control. In receipt of the disable DRA message, each of the nodes needs to determine whether or not it is in the process of performing a DRA operation in response to the detection of a failure. If it is not actively performing a DRA operation, then that node enters into a DRA disabled mode and responds to DRA OSS 40 with a "disable acknowledge" message. On the other hand, if the node indeed is in the process of executing a DRA process, it will continue with the DRA process until it reaches a safe stopping point, at which time it enters into the DRA disabled mode and issues a disable knowledge message to DRA OSS 40.

When all of the relevant nodes in DTNR domain 30 have reported back to OSS 40 with a disable acknowledge message, DRA OSS 40 sends out a message to the non-DRA process controller to inform the latter that it can begin the non-DRA restoration process with the nodes within the DTNR domain 30, without any fear that the non-DRA process would collide with the operations of the DRA process.

When the non-DRA process is completed, the non-DRA process controller sends to DRA OSS 40 a message, or request, that it re-enables the nodes under its control. Thereupon, DRA OSS 40 sends to each of the relevant DRA provisioned nodes an "enable DRA" message. The DRA provisioned nodes, in receipt of the enable DRA message, would once again be put on DRA standby mode, so as to begin a DRA restoration process when a malfunction is detected in the DRA provisioned portion of the network.

In accordance with the instant invention, the operation of a DRA provisioned node, when it enters into a DRA disabled mode, has its processing altered the following ways. Specifically, such node would continue to propagate certain types of messages to support other DRA provisioned nodes that may still be enabled and actively performing DRA type restoration. One such exemplar message is a broadcast synchronization message that ensures stepwise operation of a staged flooding DRA. Conversely, for the embodiment of the instant invention, the following stages of DRA processing are inhibited in a node when that node is in the DRA disabled mode: failure notification broadcasting, the flooding of restoration messages from a source custodial node, the selection by the custodial node of a restoration path or paths, and the subsequent messaging between the custodial nodes along the candidate restoration paths.

In the case where the DRA provisioned nodes are in a DRA exercise process, such as for example that disclosed in co-pending application entitled "Method For Exercising Distributed Restoration Process In An Operational Telecommunications Network" having reference No. RIC-96-090, the mock DRA messages that are sent from node to node to simulate an actual restoration event are not affected in any manner by the node being in the DRA disabled mode. In other words, all simulation messages are propagated and acted upon by the DRA provisioned nodes regardless of whether the node is in a DRA disabled state or transitions thereof.

Figure 2:
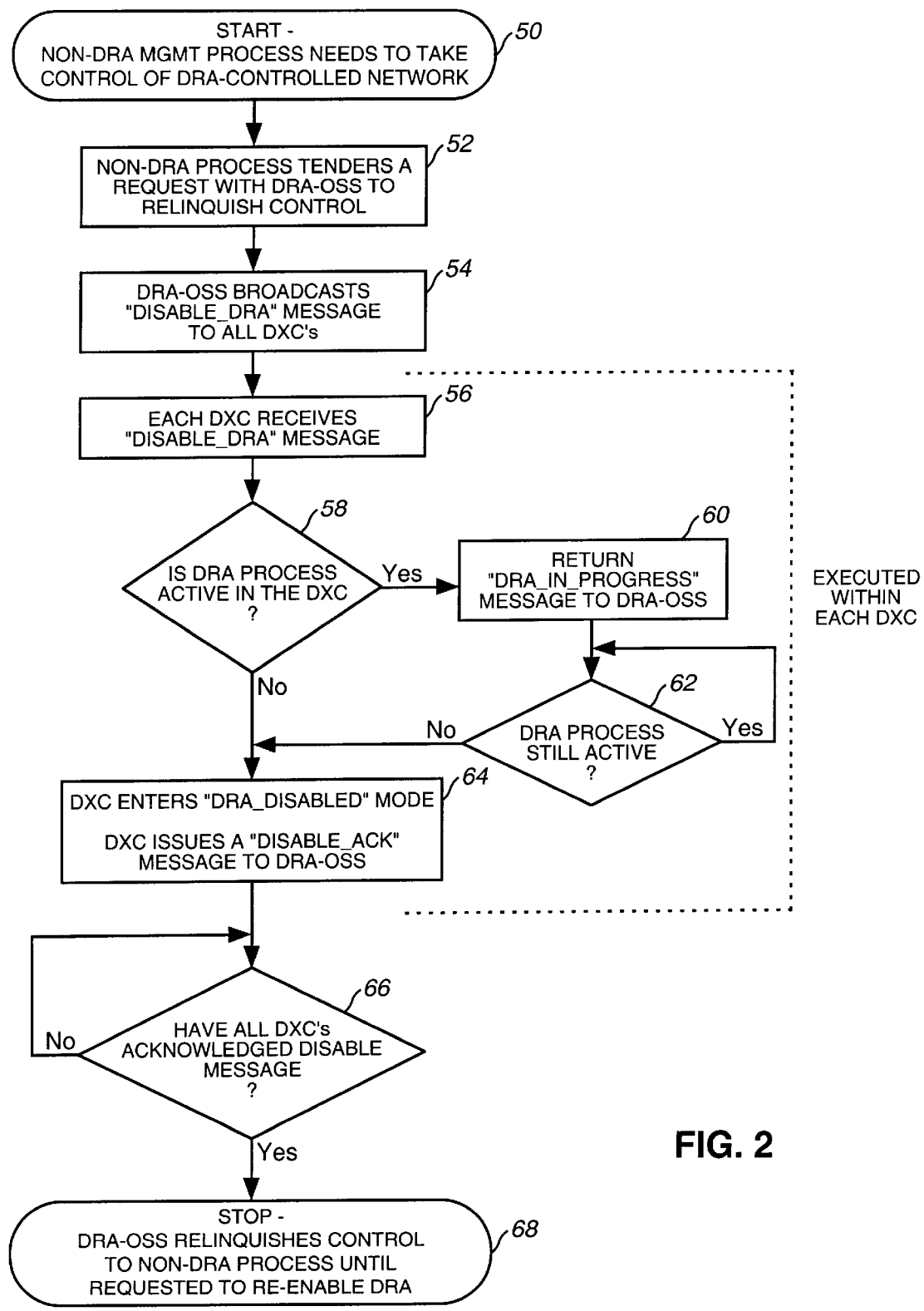
FIG. 2 is a flow chart illustrating the operation of the instant invention.

FIG. 2 is a flow chart that further illustrates the steps of the instant invention. To begin, at step 50, the non-DRA process has to gain control of those DRA provisioned nodes of the network. That being the case, at step 52, the non-DRA process, by way of its OSS, sends a message to the DRA OSS to request that it relinquish control of those DRA provisioned nodes. In receipt of this request, the DRA OSS broadcasts a "disable DRA" message to all of the nodes under its control, per step 54. Each of the DRA provisioned nodes is shown to have received the disable DRA message, per step 56. Each of those nodes then determines, per step 58, whether it is actively engaged in a restoration process utilizing DRA. If the answer is yes, then the node would return a "DRA in progress" message to the DRA OSS to inform the latter that the non-DRA restoration process could not yet take place, at least with respect to that node. This is shown in step 60. A continuous monitoring of whether the DRA provisioned node is still actively engaged in the DRA process is performed in step 62. When it is determined that the node no longer is actively engaged in a DRA process, the method of the instant invention proceeds to step 64 whereby the at issue node enters into a "DRA disabled" mode, and transmits a "disable acknowledgment" message to the DRA OSS. Thereafter, at step 65, a determination is made at the DRA OSS on whether all of the nodes under its control have returned disabled acknowledgment messages. So long as the DRA OSS has not received the disable acknowledge message from all of the DRA provisioned nodes, it waits. And when it has received the disable acknowledge message from all of the nodes, it will relinquish control of those nodes to the non-DRA process, until further instructed by the non-DRA process, by way of a request message, to reenable the DRA in the DRA provisioned nodes, per step 68.

In as much as the present invention is subject to many variations, modifications and changes in detail, it is intended that all matter described throughout this specification and shown in the accompanying drawings be interpreted as illustrative only and not in a limiting sense. Accordingly, it is intended that the present invention be limited only by the spirit and scope of the hereto appended claims.

What is claimed is:

1. In a telecommunications network having a plurality of interconnected nodes and a central management system for monitoring and controlling the respective operations of said plurality of nodes, said network being provisioned with a plurality of restoration processes at least one of which to be used by at least one portion of said network for restoring traffic disrupted in said network, a method of operating only one of said plurality of restoration processes at any one time, comprising the steps of:

broadcasting a disable process message to those nodes in said network provisioned with a given restoration process, wherein said given restoration process is a distributed restoration algorithm (DRA);

determining whether each of said given process provisioned nodes is effecting an active restoration process;

starting another restoration process if it is determined that all said given restoration process provisioned nodes are no longer actively effecting said given restoration process, wherein said another restoration process is a non-DRA scheme; and repeating the broadcasting, determining and starting steps as needed if additional restoration processes are being effected by other nodes in said network so that at any time only one restoration process is being effected for restoring disrupted traffic in said network.

2. The method of claim 1, further comprising the step of:

receiving from each of said given process provisioned nodes an acknowledge message confirming that said given restoration process is disabled.

3. The method of claim 1, wherein said network includes a central management system for monitoring and controlling the respective operations of said plurality of nodes.

4. In a telecommunications network having a plurality of interconnected nodes and a central management system for controlling the respective operations of said plurality of nodes, said network being provisioned with different restoration processes including a distributed restoration algorithm (DRA) process for at least one portion of said network for restoring traffic disrupted in said network, a method of operating the different restoration processes so that the operation of one process will not interfere with the operation of another process, comprising the steps of:

a) broadcasting a disable DRA process message to those nodes provisioned with said DRA process;

b) determining whether each of said DRA process provisioned nodes is effecting an active DRA process;

c) starting an other restoration process to restore the disrupted traffic if it is determined that all DRA process provisioned nodes which were actively effecting the DRA process has entered into a DRA disabled mode; and d) upon completion of said other restoration process, broadcasting an enable DRA message to those DRA process provisioned nodes to re-enable the DRA restoration process in those nodes.

5. The method of claim 4, further comprising the step of:
receiving from each of said DRA process provisioned nodes an acknowledge message confirming that said DRA restoration process is disabled before step c.

6. The method of claim 4, wherein said other restoration process is a real time restoration (RTR) process.

7. The method of claim 4, further comprising the steps of:

determining if there are any additional restoration process after completion of said other restoration process; and executing said additional restoration process before broadcasting said enable DRA message to those DRA process provisioned nodes if there are additional restoration process.

* * * * *